(12) United States Patent
Plantan et al.

(10) Patent No.: US 7,461,907 B2
(45) Date of Patent: Dec. 9, 2008

(54) ROD/SEAL BEARING ARRANGEMENT UTILIZING LOCKING FINGERS

(75) Inventors: Ronald S. Plantan, Westlake, OH (US); Kenneth E. Scheckelhoff, Elyria, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 151 days.

(21) Appl. No.: 11/182,811

(22) Filed: Jul. 18, 2005

(65) Prior Publication Data
US 2007/0013229 A1 Jan. 18, 2007

(51) Int. Cl.
*B60T 8/42* (2006.01)
(52) U.S. Cl. .............. 303/115.1; 277/435; 277/436; 277/551
(58) Field of Classification Search ........ 188/356, 188/73.1, 72.4, 153 R, 153 A, 153 D; 277/435, 277/551, 436, 438, 439, 530, 562, 566, 567; 403/326, 329; 92/63
See application file for complete search history.

(56) References Cited

U.S. PATENT DOCUMENTS

| | | | | |
|---|---|---|---|---|
| 2,503,854 A | * | 4/1950 | Trainor | 403/223 |
| 2,630,343 A | * | 3/1953 | Jones et al. | 277/555 |
| 3,057,630 A | * | 10/1962 | Sneed | 277/558 |
| 3,388,638 A | * | 6/1968 | Brinkel | 92/245 |
| 4,103,594 A | * | 8/1978 | Geffroy | 92/159 |
| 4,415,166 A | * | 11/1983 | Beia | 277/551 |
| 4,512,672 A | * | 4/1985 | Olschewski et al. | 384/477 |
| 4,534,088 A | * | 8/1985 | Ricke | 24/295 |
| 4,614,444 A | * | 9/1986 | Hines et al. | 384/138 |
| 4,898,493 A | * | 2/1990 | Blankenburg | 403/326 |
| 5,288,086 A | * | 2/1994 | Kiesel | 277/554 |
| 5,368,397 A | * | 11/1994 | Freiwald | 384/130 |
| 5,641,239 A | * | 6/1997 | Michalek | 403/397 |
| 5,649,469 A | * | 7/1997 | Pierce | 92/5 R |
| 5,709,283 A | * | 1/1998 | Nief | 180/428 |
| 5,836,233 A | * | 11/1998 | Rumsey | 92/63 |
| 5,927,725 A | * | 7/1999 | Tabata et al. | 277/607 |
| 5,964,536 A | * | 10/1999 | Kinoshita | 384/441 |
| 6,123,338 A | * | 9/2000 | Edelmann et al. | 277/551 |
| 6,196,552 B1 | * | 3/2001 | Peterson et al. | 277/437 |
| 6,394,462 B1 | * | 5/2002 | Constantinides et al. | 277/502 |
| 6,561,519 B1 | * | 5/2003 | Frese et al. | 277/549 |
| 6,575,471 B1 | * | 6/2003 | Grosspietsch et al. | 277/436 |
| 2005/0184469 A1 | * | 8/2005 | Ishii | 277/562 |
| 2006/0131116 A1 | * | 6/2006 | Plantan et al. | 188/153 D |

* cited by examiner

*Primary Examiner*—Robert A. Siconolfi
*Assistant Examiner*—James K Hsiao
(74) *Attorney, Agent, or Firm*—Crowell & Moring LLP

(57) ABSTRACT

An improved seal/bearing arrangement employs an O-ring type seal which has segmented fingers. The seal ring has a recess which is sized to mate with a corresponding projecting lug of a bore use, for example, in brake actuator mechanisms. The seal ring can be made from synthetics such as polyamides and polyethylenes. The fingers are so arranged that locking of the seal rings in the bore occurs with insertion of a sliding, oscillating and/or rotating shaft or the like through the rings.

24 Claims, 3 Drawing Sheets

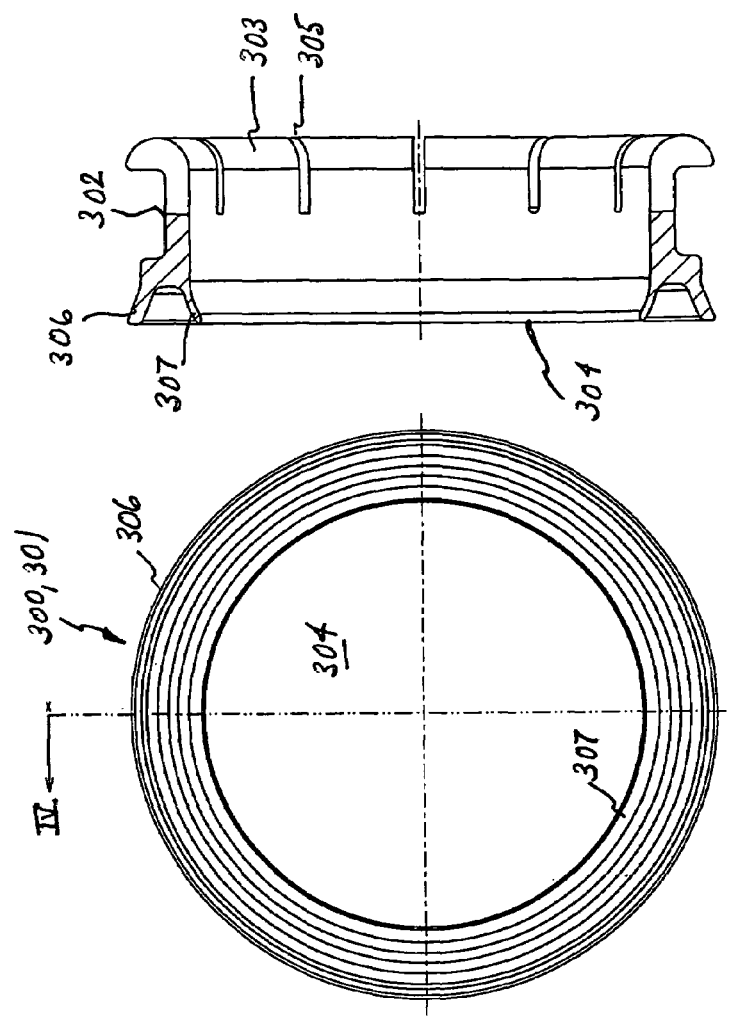
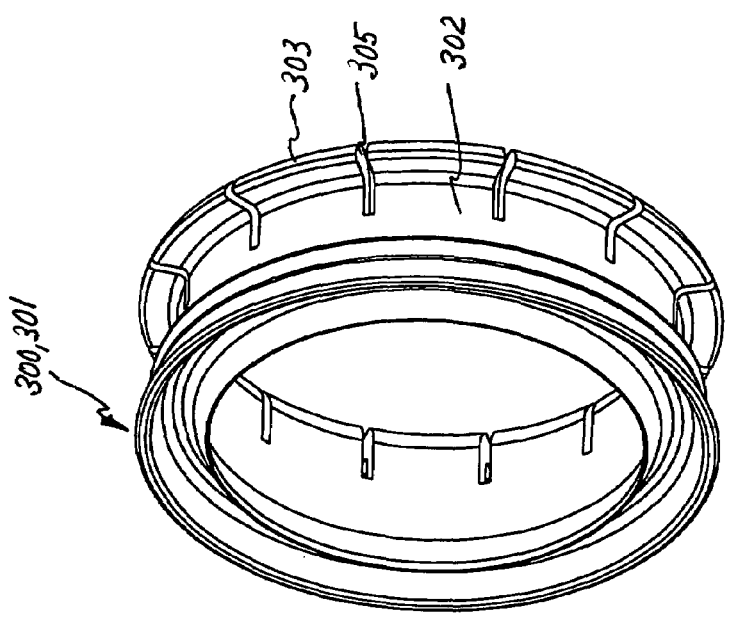

ROD/SEAL BEARING ARRANGEMENT UTILIZING LOCKING FINGERS

BACKGROUND AND SUMMARY OF THE INVENTION

The present invention relates to a rod/seal bearing arrangement and, more particularly, to a novel sealing device provided with locking fingers for use in an arrangement such as a spring-type brake actuator and like devices which require an effective, durable fluid seal at openings where sliding, rotating and/or oscillating members are present.

Conventional spring brake actuators are shown and described in U.S. Pat. No. 5,507,217 and in WO 94/21892. A general description of these kinds of conventional actuators is found in the background section in our co-pending application Ser. No. 11/012,313, filed Dec. 16, 2004, that description also being incorporated herein by reference.

Common characteristics of known spring-type brake actuators typically include a housing, a rear cylinder containing a displaceable piston for actuating a parking brake and an associated front cylinder with a displaceable piston for actuating a service brake. An intermediate wall or flange is provided between the front and rear cylinders, in which rear cylinder a connecting rod or shaft forming part of the parking brake release actuator system is movable between parking brake actuated and release positions.

In the past, it has been customary to employ conventional seals, such as elastomeric O-ring seals and bushings, between the connecting rod and the adjoining portion of the intermediate wall in a spring-type brake actuator. The aforementioned U.S. Pat. No. 5,507,217 shows such an arrangement in which bearings are arranged between the push or connecting rod and the aperture in the adjoining portion of the flange casing. WO 94/21892 shows a sealed bearing arrangement comprised of multiple rings and an O-ring. Other variants of conventional seal arrangements are found, for example, in U.S. Pat. Nos. 5,002,164; 5,058,904; 5,320,026; 5,934,733; and 6,394,462.

The foregoing known arrangements have a variety of drawbacks. Current seal design does not allow for long service life while also maintaining, or even improving, ease of installation and replacement. Worn seals also can aggravate alignment problems with regard to the connecting rods and associated springs. Seal configurations that seek to avoid those problems typically do so through a complicated design that increases costs and/or defeats the goals of easy installation and replacement.

Given the heavy-duty construction of spring-type brake actuators, in particular due to the nature of their intended use (e.g., commercial trucks, tractors and trailers), ease of servicing the internal components which are subject to wear and weathering from road conditions is a major concern. In addition, proper sealing in the front and rear cylinders is desired in order to provide reliable, safe operation of the parking brake and service brake actuators. A particular area of concern is the interface between the connecting shaft and the intermediate wall dividing the brake actuator spring recess and the rear chamber. The seal at that interface is subjected to substantial wear due to repeated sliding movement of the connecting shaft and thus should be easily installable and removable when replacement is needed. Moreover, the seal assembly should have a relatively long service life and reliably reduce dust and dirt intrusion and the like over that life. Furthermore, there is a desire to prevent misalignment of the connecting shaft due to seal wear and the design of the seal itself.

Given the widespread need for sealing in a vast array of mechanical devices, continuing efforts are always being made to improve seal construction from the point of view of operation, reliability, ease of installation and cost. In addition to the aforementioned O-ring type seals, seal assemblies that are, for example, segmented are known as disclosed in U.S. Pat. No. 5,058,904. Such arrangements find particular use in carbon seals used in gas turbine engines where sealing is of critical importance. They are, however, typically relatively complicated multiple component arrangements that are difficult to replace for overall and repair operations. Even where the parts are preassembled for easy installation and removal, such an assembly is expensive and unduly complicated.

An object of the present invention is, therefore, to provide a seal arrangement which is simple in design, has excellent service life and sealing characteristics in areas of sliding, rotating and/or oscillatory motion, and is easily installable and replaceable in an apparatus, particularly one in which seals are subjected to a harsh environment.

These and other objects and advantages have been achieved by a rod/seal bearing arrangement for use in a variety of sliding, rotating and/or oscillatory movement applications, e.g. a spring-type brake actuator, in which a generally O-ring shaped seal or lip-seal is configured with locking "fingers" that positively retain the seal ring in the bore of the particular kind of assembly in which it is employed during operation of the sliding, rotating and/or oscillatory member with which it is associated.

Given the presence of the locking fingers, the seal ring(s) is/are locked in place once the associated shaft has been inserted through the seal arrangement which have been already installed in a bore of a particular device where a sliding, rotating and/or oscillatory device is operative. The configuration of the locking finger is such that damage to the seal(s) will not occur upon assembly in a brake actuator or other like assembly incorporating a member that undergoes sliding, rotating and/or oscillatory motion. Another advantage of the present invention is that the use of two seal rings with the locking fingers of the present invention forms a bearing arrangement that helps to prevent misalignment problems with the associated shaft.

The seals according to the present invention can be made of suitable and commercially available synthetics such as plastics (e.g., polyamides such as nylon) and can be made relatively inexpensively by injection molding and the like.

BRIEF DESCRIPTION OF THE DRAWINGS

Other objects and advantages of the invention will become apparent from the following description of embodiments with reference to the accompanying drawings in which:

FIG. 2 is an isolated perspective view of one of the seal rings of the sealing/bearing arrangement shown in FIG. 1;

FIG. 3 is an end view of the seal ring shown in FIG. 2;

FIG. 4 is a cross-sectional view of the seal ring along line IV-IV in FIG. 3.

DETAILED DESCRIPTION OF THE DRAWINGS

Figure 1:
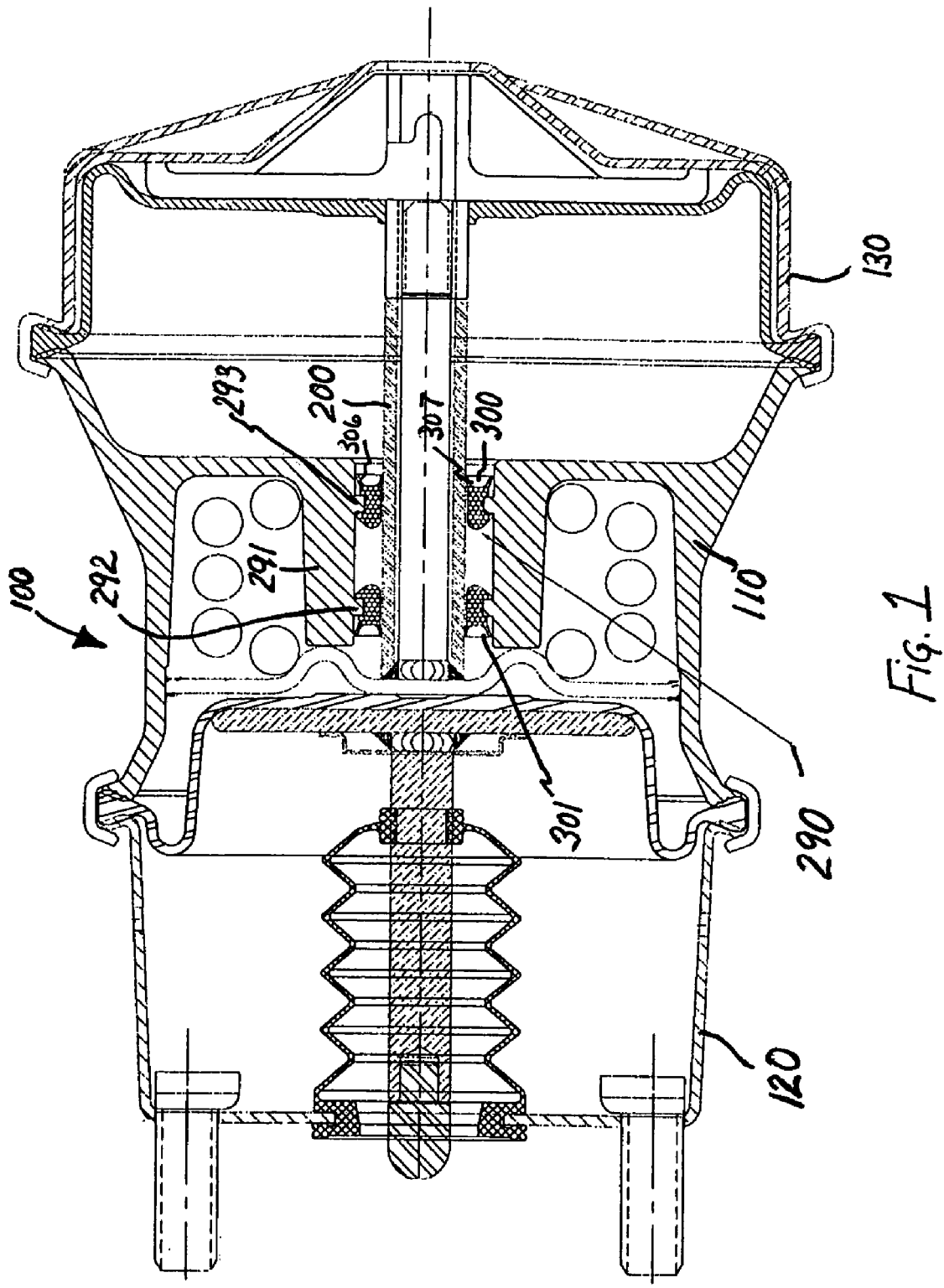
FIG. 1 is a cross-sectional assembly view of a spring-type brake actuator utilizing the sealing arrangement according to the present invention.

Referring now to the assembly view of FIG. 1, the improved spring-type brake actuator shown therein is designated generally by the numeral 100 and operates as described in our said co-pending U.S. patent application Ser. No. 11/012,313. The present application dispenses with showing and describing unnecessary details regarding structural and functional aspects of the front cylinder 120 and the rear cylinder 130, and focuses on the specific structural features pertaining to the invention described below which will be more than sufficient to allow one of ordinary skill to make and use that invention. Moreover, the seal/bearing arrangement of the present invention is applicable to a wide variety of mechanical devices and not merely to the field of brake actuators.

In particular, FIG. 1 shows the general arrangement of the seal/bearing assembly 290 according to the present invention in which two seal rings 300, 301 of the type shown in isolated perspective view in FIG. 2 are disposed between the central opening in a hub 291 of the intermediate flange 110 and the outer surface of the connecting shaft 200. To retain or lock the seal rings 300, 301 in their desired location in the hub 291, the hub is formed with radially-inwardly projecting portions or lugs 292, 293 around the circumference of the central opening at two spaced locations. These lugs or portions are sized to create a snug fit by snapping by a corresponding groove or recess 302 (FIG. 2) formed along the outer periphery of the seal rings 300, 301 approximately mid-way between the axial end faces snapping onto the respective lug and thereby "lock" the seals in place when the connecting shaft has been inserted through the seal openings.

One axial end of each of the seal rings 300, 301 is segmented in that it is provided with a plurality of locking fingers 303 with spaces 305 therebetween roughly similar in appearance to tabs used on conventional port thread protectors. One of the criteria for material selection is the ability of the fingers to move radially inward for allowing easy insertion of the connecting shaft 200 via the axial end 304 of the seal 300 and through the axial opening end of the segmented end of the seal 301 as shown in FIG. 1 until the respective lug 292, 293 lock in the groove 301 of the respective seal to retain the seal in place. The springiness of the fingers 303 around the shaft 200 and their slight curvature at the inner circumference of the seal rings assure a positive lock but, at the same time allows easy installation or removal.

The outer and inner circumference of the seal rings 300, 301 between the other axial face 304 and the groove 302 has a concave shape defining sealing lips 306, 307 that engage the bore opening and connecting shaft surfaces to provide a positive seal against dirt and fluid intrusion into the seal/bearing arrangement. Although sufficient compression exists at zero pressure to provide effective sealing, the air pressure built up during operation will tend to increase the sealing ability of each seal.

The seal rings can be made of any suitable low-friction, low maintenance material suitable for sealing in a hostile road environment involving rotating or oscillating interface between a wall and a sliding or rotating member such as the connecting shaft e.g., PTFE-based materials. That will also include the use of self-lubricating synthetics. The seal rings can be, for example, fabricated from suitable commercially available synthetic materials such as polyamides (e.g., nylon), polyethylene, and other polymers with appropriate sealing and friction characteristics. Typical of such materials that are also resistant to contamination and wear and are self-lubricated as well are Fiberglide® self-lubricated bearing liner, marketed by America Metal Products Co. of Detroit Mich., Norglide® self-lubricated sliding bearings marketed by Saint-Gobain's Bearing and Wear Technology Unit and PolyGlyde™ self-lubricating seals marketed by CoorsTek of Golden, Colo. Alternatively or additionally, lubricant can be provided between the seal rings in the annular chamber defined therebetween to increase seal life even further.

With the seal/bearing arrangement according to the present invention, the seal rings 300, 301 are first installed in the hub 291 before insertion of the shaft 200 during assembly of the actuator or during reassembly with servicing or repair. That is, the segmented faces are opposed to each other (i.e., face inwardly toward each other). The shaft 200 is then inserted through the central openings in the seal rings which form a bearing arrangement that properly aligns the shaft in the assembly. Insertion of the shaft also locks the seal rings in place as a result of pushing the fingers 305 outwardly and locking them over the lugs 292, 293, respectively the fingers 303.

Figure 6:
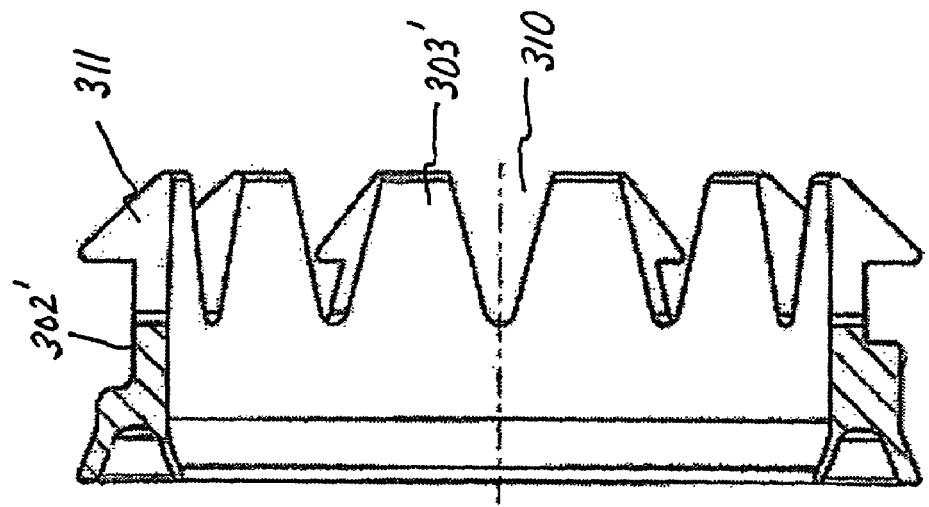
FIG. 6 is a cross-sectional view along line VI-VI in FIG. 5.
Figure 5:
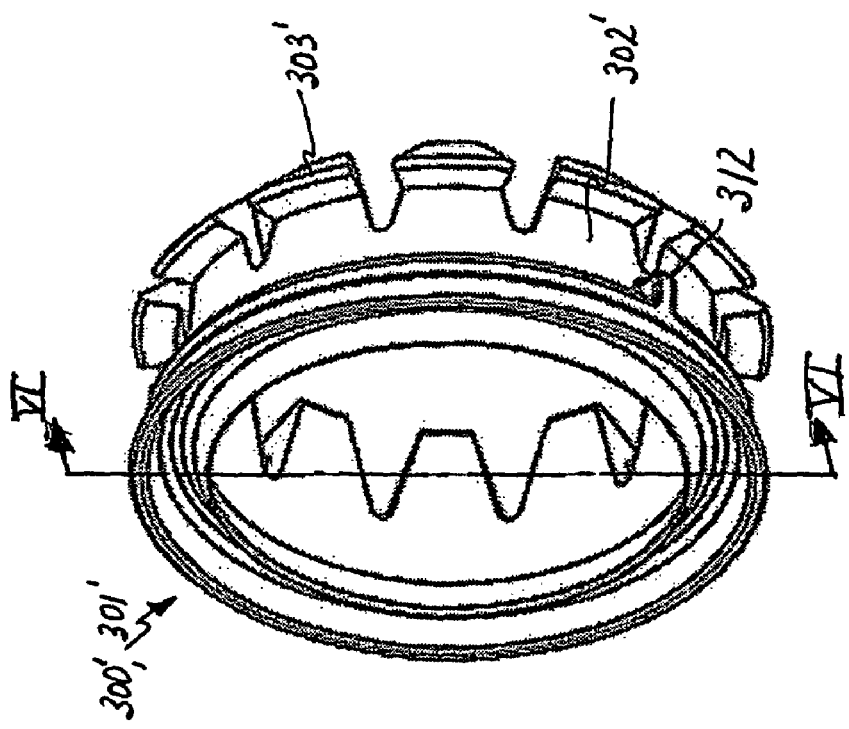
FIG. 5 is an insolated perspective view of another seal ring embodiment in which V-shaped spaces are defined between the fingers and an anti-rotation mechanism is provided.

According to a second embodiment of the seal rings as shown in FIGS. 5 and 6, where parts similar in structure and function (except where specifically stated) to the parts in FIGS. 2-4 are designated by the same numerals but primed space the seal rings 300', 301' have fingers 303' that define a V-shape space 310 therebetween and a wedge-shaped edge 311 as viewed in axial cross-section. The configuration of the spaces 310 around the rings 300', 301' permits easier installation of the rings on the shaft in that the ring structure collapses more uniformly in the bore of the hub 291.

In addition, this second embodiment is provided with one or more tabs or raised portions 312 which mate(s) with a corresponding notch or cavity (or notches) in a fixed portion of the assembly. Thereby, when used in particular with rotating shafts, the seal/bearing rings 300', 301' will not rotate. It will also be understood that this anti-rotation feature can be utilized in connection with the first embodiment shown in FIGS. 2-4.

Although seal rings of the above-mentioned type are described in the context of use in a brake actuator in particular a spring-type brake actuator, it should be clearly understood that the present invention contemplates uses in any application where positive sealing and ease of installation are required or desired between a sliding, oscillating and/or rotating member and a mating surface. Therefore, we do not wish to be limited to the details shown and described herein, but intend to cover all such changes and modifications as may be encompassed by the appended claims and equivalents to the terms employed in those claims.

What is claimed:

1. A seal ring, comprising
    a body having an approximately O-ring shape defining opening through the body;
    an outer peripheral surface of the body having a recess formed therein;
    a first axial end face of the body being segmented to define a plurality of radially extending fingers arranged around the opening; and
    a second axial face of the body having radially spaced outer and inner sealing lips arranged around the opening and defining therebetween a concave shape as viewed in an axial direction of the body.

2. The seal ring according to claim 1, wherein the body is comprised of synthetic material.

3. The seal ring according to claim 2, wherein the material is selected from the group consisting of polyamides and polyethylenes.

4. The seal ring according to claim 2, wherein the material is self-lubricating.

5. The seal ring according to claim 1, wherein the fingers are configured with a curvature at an inner circumference of the body such that the fingers have a generally convex shape as viewed in an axial direction of the body.

6. The seal ring according to claim 1, wherein the fingers define a lip seal.

7. The seal ring according to claim 1, wherein the body is provided with a mechanism capable of preventing rotation of the seal ring.

8. The seal ring according to claim 1, wherein the fingers define V-shaped spaces therebetween.

9. A seal/bearing assembly, comprising
a first member having a central opening provided with at least one radially projecting lug;
a second member operatively arranged to at least one of slide, oscillate and rotate with respect to the first member; and
at least one seal ring provided between the first and second members, wherein
the at least one seal ring comprises a body having an approximately O-ring shape defining an opening through the body;
an outer peripheral surface of the body having a recess formed therein;
a first axial end face of the body being segmented to define a plurality of radially extending fingers arranged around the opening; and
a second axial face of the body having radially spaced outer and inner the sealing lips arranged around the opening and defining therebetween a concave shape forming upper and lower sealing lips, with the recess being configured to mate with the radially projecting lug of the first member.

10. The assembly according to claim 9, wherein the body is comprised of synthetic material.

11. The assembly according to claim 10, wherein the material is selected from the group consisting of polyamides and polyethylenes.

12. The assembly according to claim 10, wherein the material is self-lubricating.

13. The assembly according to claim 9, wherein the fingers are configured with a curvature at an inner circumference of the body such that the fingers have a generally convex shape as viewed in an axial direction of the body.

14. A method of installing a seal/bearing arrangement in a brake actuator, comprising
inserting seal rings in a central bore of an intermediate flange arrangeable between front and rear cylinders of the brake actuator, the seal rings being comprised of a body having an approximately O-ring shape; an outer peripheral surface of the body having a recess formed therein; a first axial end face of the body being segmented to define a plurality of radially extending fingers; a second axial face of the body having radially spaced and outer and inner sealing lips defining therebetween a concave shape forming upper and lower sealing lips, and the central bore having axially spaced radially projecting lugs sized and configured to snugly engage the recess in the seal rings upon insertion thereof at the desired location in the central bore, and
inserting a shaft of a parking brake release actuator through the installed seal rings so as to lock the seal rings in place via the fingers.

15. The method according to claim 14, wherein the segmented axial end face defining the fingers of each sealing ring are opposed to each other in the installed state.

16. The method according to claim 14, further comprising placing lubricant between the seal rings prior to insertion of the shaft.

17. The method according to claim 14, further comprising constructing the body from synthetic material.

18. The method according to claim 17, further comprising selecting the material from the group consisting of polyamides and polyethylenes.

19. The method according to claim 17, further comprising selecting the material to be self-lubricating.

20. The method according to claim 19, further comprising placing lubricant between the seal rings prior to insertion of the shaft.

21. The method according to claim 14, further comprising configuring the fingers with a curvature at an inner circumference of the body such that the fingers have a generally convex shape as viewed in an axial direction of the body.

22. The method according to claim 14, further comprising preventing the seal ring body from rotating.

23. The method according to claim 14, further comprising configuring the fingers to define a V-shaped space therebetween.

24. The method according to claim 23, further comprising configuring the fingers to define a wedge-shaped cross-section as viewed in an axial direction of the seal ring body.

* * * * *